United States Patent [19]

McInroy et al.

[11] 4,416,558

[45] Nov. 22, 1983

[54] METHOD OF CONTROLLING A PRINTER IN AN INTERACTIVE TEXT PROCESSING SYSTEM TO PRINT RECORDS FROM STORED FILES OF SPATIALLY RELATED DATA

[75] Inventors: John W. McInroy; Paul D. Waldo; Harold R. Webster, all of Austin, Tex.

[73] Assignee: International Business Machines Corporation, Armonk, N.Y.

[21] Appl. No.: 264,301

[22] Filed: May 18, 1981

[51] Int. Cl.³ ............................................. B41J 25/18
[52] U.S. Cl. .................................... 400/279; 400/83; 400/76; 364/900
[58] Field of Search .......................... 400/76, 83, 279; 364/900

[56] References Cited

U.S. PATENT DOCUMENTS 3,952,852  4/1976  Greek, Jr. et al. ............... 400/76 X
4,212,553  7/1980  Acosta et al. ..................... 400/76 X
4,223,393  9/1980  Abe et al. .......................... 400/76 X

FOREIGN PATENT DOCUMENTS 2029614  3/1980  United Kingdom ................ 400/279

OTHER PUBLICATIONS

IBM Technical Disclosure Bulletin, "Forms Layout Storage for a Typewriter," Churgovich, vol. 24, No. 8, Jan. 1982, p. 4331.

*Primary Examiner*—Ernest T. Wright, Jr.
*Attorney, Agent, or Firm*—Richard E. Cummins

[57] ABSTRACT

An improved method is disclosed for printing a file of spatially related data stored in an interactive text processing system as vector formatted records. The method involves establishing for the printer the number of print positions for the print line, and transferring the field titles which make up the header portion of the file from storage to the print buffer sequentially, along with an indication of the maximum permissible field width until all of the field names have been transferred. The process involves determining when a new print line is to be started for the header data in those situations where more than one print line is necessary to accommodate all of the field name data of the header by determining if the next field in the sequence to be printed will fit in the space left on the print line previously specified and, if not, then entering a carriage return signal after the last transferred field. The process continues until all of the field names have been transferred. During the process a table is established indicating by line number and print position number where each field of a record starts.

6 Claims, 5 Drawing Figures

```
           1           2           3           4           5           6           7         7
 0123456789012345678901234567890123456789012345678901234567890123456789012345678 9
 REC.ID.    PATENT NUMBER    ISSUE DATE    SERIAL NO.   FILING DATE
 ASSIGNEE              1st INVENTOR                2nd INVENTOR
 3rd INVENTOR          4th INVENTOR            5th INVENTOR
 PRIORITY COUNTRY   P.O.CLASS OR   P.O.CLASS XR1   P.O.CLASS XR2   P.O.CLASS XR3
 P.O.CLASS XR4   P.O.CLASS XR5

1.     3,213,500          02/10/65     870116         04/04/62
 I.B.M.                            PATRICK                     CRAVER
 JONES                             BELL                        ****
 U.S.            360.128           232.27       364.200        364.900
 ****           ****
                                         R1

2.     3,951,123          12/12/69     123456         01/01/66
 XYZ                               HENRY                       ****
 ****                              ****
 U.S.            179.11Z           228.10       348.89         350.9
 42.43           98.567                 R2
```

```
          1           2           3           4           5           6           7
0123456789012345678901234567890123456789012345678901234567890123456789
REC.ID.   PATENT NUMBER    ISSUE DATE    SERIAL NO.    FILING DATE
ASSIGNEE
3rd INVENTOR         4th INVENTOR    1st INVENTOR    5th INVENTOR    2nd INVENTOR
PRIORITY COUNTRY    P.O.CLASS XR5    P.O.CLASS XR1    P.O.CLASS XR2    P.O.CLASS XR3
P.O.CLASS XR4

1.        3,213,500        02/10/65      870116        04/04/62
I.B.M.                     PATRICK                     CRAVER
JONES                      BELL
U.S.          360.128         232.27        364.200       364.900
****                                         ****
42.43                                                                  R1    123456       01/01/66

2.        3,951,123        12/12/69
XYZ                        HENRY
****                       ****                          ****
U.S.          179.112         228.10         348.89       350.9
98.567                                                                 R2
```

FIG.5

METHOD OF CONTROLLING A PRINTER IN AN INTERACTIVE TEXT PROCESSING SYSTEM TO PRINT RECORDS FROM STORED FILES OF SPATIALLY RELATED DATA

DESCRIPTION

Technical Field

This invention relates in general to interactive text processing systems which also process spatically related data and, in particular, to an improved method for controlling the output printer of the system during the printing of a stored file of spatially related data.

RELATED APPLICATIONS

Ser. No. 264,368, entitled "Method for Editing Spatially Related Data in an Interactive Text Processing System", filed concurrently herewith and commonly assigned by the inventors W. C. Cason et al. is directed to a method for displaying and editing spatially related data in an interactive text processing system where the spatially related data is stored in vector format and in which one editing process is used for editing both text and file type data.

PRIOR ART

A typical interactive text processing system currently operational in many office environments comprises a keyboard, a display, a printer, a diskette storage device and a microprocessor which has been programmed to cause interaction of the various system components to perform numerous text processing functions. One of the main functions of a text processing system is to create a document on the output printer which may, for example, be a single one-page letter or a multi-page manuscript. The interactive nature of these systems initially involves a query-response type mode of operation where the system displays the questions or available options to the operator and, perhaps, a number of responses. The operator then indicates the response by pressing a defined character key or by keying in the requested data. By such a procedure, the various parameters of a document format may be defined to the system. The system is then placed in the text entry mode so that actual text is keyed in by the operator and displayed on the screen in a format generally resembling that which would appear on the printed document.

It will be appreciated that the text is entered initially as a series of keystrokes, each of which is converted to a byte or character of data in the system that is subsequently stored in the memory of the microprocessor. Most keystrokes that are entered will represent characters of data and will be recognized as such by the microprocessor so that these will be transferred by the microprocessor to the display refresh buffer from which the characters will be displayed on the display screen. It will be recognized also that a limited number of keystrokes generate text format control data, such as a paragraph indent signal achieved by tabbing, or a carriage return signal. These text format bytes are recognized by the microprocessor which provides the required character control signals to the display refresh buffer. The other function of the microprocessor is to supply to the refresh buffer a cursor character signal which is displayed to the operator as an indication where the character representing the next keystroke will be displayed.

In many applications, after all the text has been entered, the operator requests a printed document from the system. The system then enters the printing mode and prints the document, employing the stored format parameters and the text. The document, as stored in memory, comprises a series of data and control characters and may be transferred to diskette storage before the document has been printed. The name of the document is also added to the index of documents kept by the system. This permits the document record to be subsequently retrieved.

After the printed document has been edited by the author, the operator recalls the document from diskette storage into main memory and causes it to be displayed by the system, which is placed in an update mode. The operator may then position the cursor by operation of cursor move keys to a character position on the display which is to be modified, e.g., to a word to be deleted. The operator merely presses a delete key before moving the cursor through the characters of the word by the cursor control key, and the word is erased in storage by action of the microprocessor and will, therefore, not appear in the updated document.

Those familiar with the internal operation of text processing systems employing microprocessors understand the various detailed steps that the microprocessor takes in converting a simple keystroke into a character on the display screen and to a byte of binary data in a storage location in memory while "simultaneously" controlling the position of the cursor on the display screen to assist the operator to properly format the document.

In most text processing systems, the text data is merely stored sequentially in memory as the sequence of keystrokes occurred, i.e., character data interspersed by the appropriate control data such as paragraph indents, carriage returns, line advances, etc. In many systems, the document format parameters, such as page length, left and right margins, line spacing, type font, etc., are stored independently of the text data and, hence, the text format parameters of the final document can be entirely different than the parameters employed when the text was initially entered into the system.

Sequential keystroke information storage of text data does permit the implementation of a number of different editing functions which enhance the performance and desirability of text processing systems. These functions range from the simple revision feature, such as deleting, adding or changing characters or words, to more sophisticated features, such as checking the spelling of all words in the document against a defined list of words or automatically replacing a defined word with another word at every occurrence in the document.

Text processing systems of the type described above, however, do not have the capability of easily manipulating data that is spatially related, such as data which is arranged in a matrix of rows and columns. Where it is also desirable to process spatially related data in an interactive text processing system, the prior art systems employ an entirely different set of programs for processing spatially related data. One reason for the different set of programs is that there is an advantage in storing spatially related data in a vector format since this permits data processing type of functions, i.e., sorting of record fields or repositioning of fields, by the microprocessor quite easily. Hence, since the spatially related data is stored differently in the system than text data, the simple type of editing functions which must also be done on the spatially related data have required in the past their own set of programs stored with the microprocessor.

It has been found that considerable storage space can be saved if the display and editing processes for text data can also be used for displaying and editing data stored in a vector format. Data stored in a vector format implies a spatial relationship among the data, i.e., predefined field positions, field lengths and the number of fields in each vector or record. Such a system is described and claimed in copending related application Ser. No. 264,368, filed concurrently herewith and assigned to the assignee of the present invention, referred to earlier. Vector formatted data, as discussed herein, may be of the type shown in FIG. 6 of Ser. No. 264,368 mentioned above. The display and editing processes for text data in that system are also employed to display and edit the spatially related data by converting a predetermined amount of the vector stored data to text data. The display and editing processes then function as if the spatially related data was really text.

As described in that application, spatially related data is first entered into the text processing system in a conventional query-response mode until all of the potntial parameters of the spatial relationship of the data or coordinate system are stored. The system then displays the header portion of the matrix showing, for example, the name and width of each column. The system further positions the cursor at the starting position in the upper left corner, which can be defined as row 1, column 0, character position 0. Data is then entered into each column and is displayed as conventional text data, the cursor being appropriately positioned after each keystroke. The operator also has the capability of moving the cursor one character position at a time in accordance with normal text conventions. Internally, the captured keystrokes are stored in memory as conventional control characters and text data so text can be displayed in a conventional manner. The data of each row subsequently is encoded as a vector where the spatial relationship of the data in the matrix is defined, and the vector is stored for later use.

Subsequent modification of the vector is done either on the encoded vector, if the modification involves a change in the spatial relationship, or on the decoded vector, if the modification is to the actual data. An example of one modification which can be accomplished would be the relocation or repositioning in the matrix of rows in accordance with the data in one column, i.e., sorting and collating. Such operations in conventional text processing systems would be extremely cumbersome and time consuming, if not impossible. However, since all the data is identified spatially, it becomes a relatively simple matter for the microprocessor to identify the vector and to modify its spatial parameters in accordance with the desired changes.

If changes to the data per se are desired, the vector is merely decoded and the data displayed as conventional text. The data is then edited in a conventional text processing mode by the same process and programs employed to edit text data, thus avoiding the necessity of a completely new process to edit vector data. After editing, the data is again encoded as a vector for storage.

While the operation of the system in transferring records from storage for display on the display device of the system is, in some respects, similar to transferring the data from storage to the printer, there are some additional factors which must be taken into account in conventional text processing systems. In a known prior art system, where the length of the record is relatively long, the entire record may be displayed by horizontally segmenting the record, which occurs generally automatically in response to the position of the cursor. The horizontal segmenting process is not achieved or obtainable on a printer when the length of the record exceeds the selected print capacity of a print line.

Therefore, the system generally provides some means of establishing the print format for the file of spatially related data which involves an interactive process with the operator selecting from various parameters of the print formats as they are displayed on the screen.

In known text processing systems, where the operator merely wants a copy of the records as stored in the file, the various print format parameters must be interactively defined, which sometimes involves a complex query-response interaction, especially where the record length exceeds the printing capacity or selected print capacity of a printing line. The present invention simplifies that operation.

SUMMARY OF THE INVENTION

The present invention is directed to a method of controlling the printer in an interactive text processing system where the system is printing a file of spatially related data that has been stored in the system as vector formatted records. In accordance with the improved method, the file header information which consists of the field or column names is printed sequentially in spaced apart relationship, with each field occupying the number of print positions initially assigned when the file was established. The fields are spaced apart, for example, by three print positions. In the sequential printing of the field names, a check is made by the system before printing the next field to insure that the print capacity of the line previously defined by the operator to the system will not be exceeded. If the line capacity will be exceeded, a carrier return control character is inserted and the field is printed at the beginning of the next line. The header printing process continues in the same manner until all the header information has been printed.

During the printing of the header, the system establishes a correlation of the field number to the line number and the print position at which the field starts. The printing of each record involves (1) setting tab positions of the printer at the start of each line in accordance with the data that was generated specifying the print positions of the start of each field assigned to that line, and (2) transferring the data from each column vector to the printer, followed by a tab control character which positions the carriage at the beginning of the next field. The new position is in line with the start of the corresponding field title in the header.

It is, therefore, an object of the present invention to provide an improved method for controlling the printer in an interactive text processing system during the printing of records from a file of spatially related data.

A further object of the present invention is to provide in an interactive text processing system an improved method involving the operator supplying a minimum amount of format data to the system prior to printing a file of spatially related data.

A still further object of the present invention is to provide an improved method for printing a file of spatially related data records on an interactive text processing printer in which the printed length of each record exceeds the line length capacity of the printer.

The foregoing and other objects, features and advantages of the invention will be apparent from the following more particular description of a preferred embodiment of the invention as illustrated in the accompanying drawing.

BRIEF DESCRIPTION OF THE DRAWING

FIG. 5 illustrates how a file of spatially related data appears if printed by the system shown in FIG. 1 in accordance with the method of the present invention.

DESCRIPTION OF THE INVENTION

The improved method of the present invention will be described as embodied in a conventional text processing system, represented by the functional block system diagram shown in FIGS. 1-4. The description will not involve the details of the conventional text processing system, other than the functional aspects of such a system necessary to an understanding of the present invention. The description likewise will not involve the hardware or program details of the microprocessor other than those aspects necessary to understand a programmed implementation of the improved method. The specific details of an interactive test processing system of the type shown in block diagram form in FIG. 1 may be found in the following publications of the IBM Corporation: "Displaywriter System Product Support Manual," Order No. S241-6248-1, Copyright 1980 and "IBM Displaywriter System Printer Guide," Order No. S544-0861-2, Copyright 1980.

Figure 1:
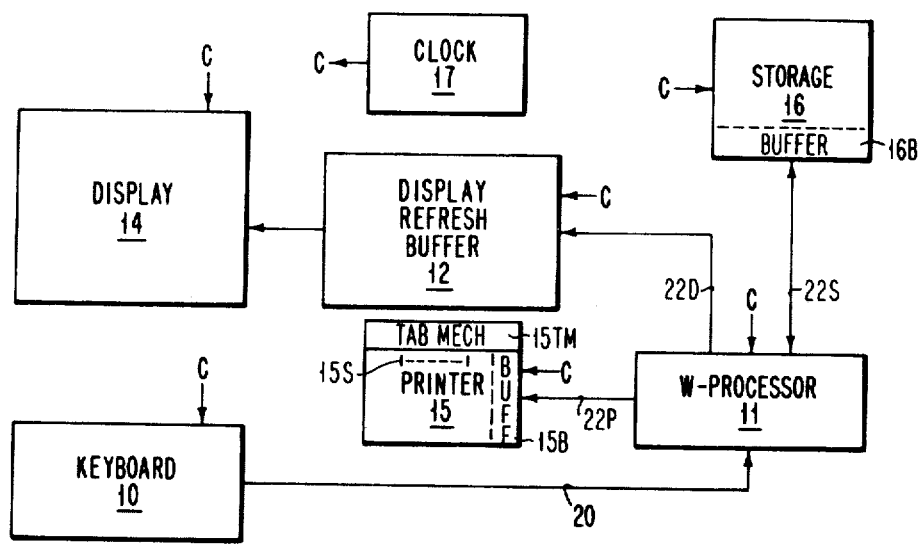
FIG. 1 is a block diagram of an interactive text processing system embodying the present invention.

With reference to the drawing, and particularly to FIG. 1, the text processing system illustrated therein comprises a keyboard 10, a microprocessor 11, a display refresh buffer 12, a display device 14, a printer 15, and an auxiliary diskette storage device 16. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys like carriage return, indent, etc. In addition, the keyboard 10 includes a second set of control keys for issuing special control commands to the system. The second set of control keys include cursor movement keys, keys for setting the keyboard 10 into a number of different modes, etc.

Figure 2:
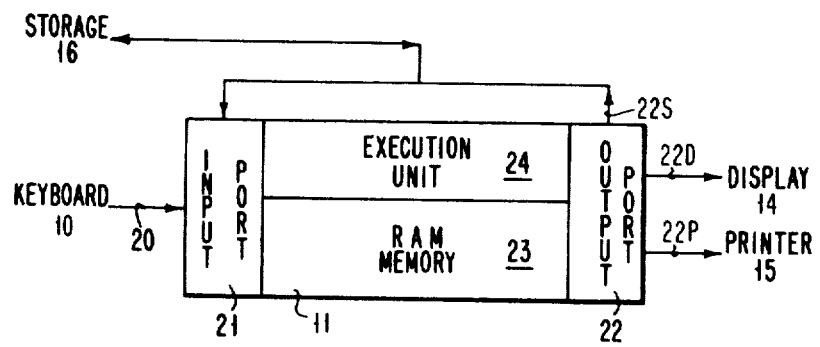
FIG. 2 is a functional diagram of the microprocessor shown in FIG. 1.

The keyboard 10 is connected to the microprocessor 11 by means of a bus 20. The microprocessor 11, as shown in FIG. 2, comprises an input port 21, an output port 22, a random access memory 23, and a process execution unit 24.

Figure 3:
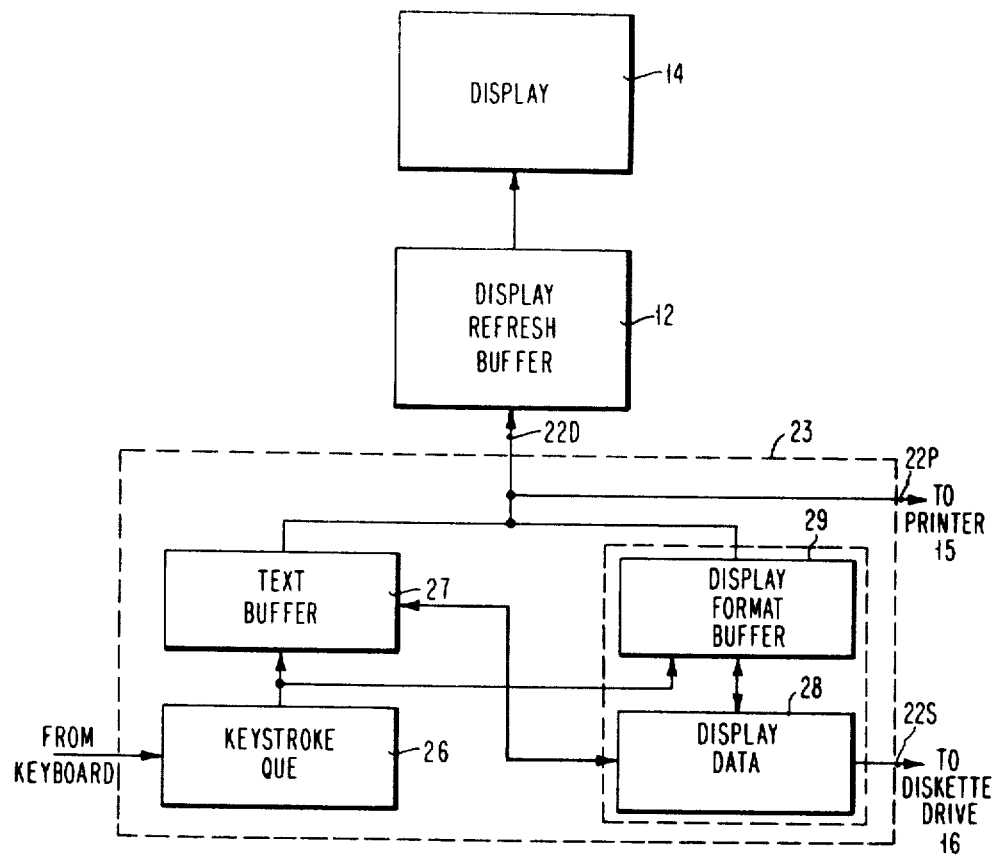
FIG. 3 is a functional diagram illustrating the data flow path between portions of the memory and the microprocessor and the display refresh buffer.

Functionally, memory 23 stores both instructions and data in specified sections which will be described in more detail later on in the specification. Data is entered into memory 23 from the keyboard 10 as bytes of binary information through input port 21. As shown in FIG. 3, the section of RAM 23 which receives the keystroke data from the keyboard 10 is designated keystroke queue 26. Data to b displayed is transferred by a series of instructions from queue 26 to the text buffer section 27 and then to the display refresh buffer 12 through output port 22 of the microprocessor 11 over line 22D. This is achieved in a conventional way by the microprocessor 11 executing a series of move instructions.

The microprocessor 11 may be an INTEL model 8086 or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen 14S (FIG. 4) of the display device 14 by exercising on-off control of the beam as it traces a series of horizontal lines across the screen 14S.

The output port 22 also supplies data stored in memory 23 to the printer 15 via line 22P and diskette storage device 16 via line 22S, each of which may have their own internal buffers 15B and 16B. Commands to transfer data from the random access memory 23 to the printer 15 or storage device 16 are sent to the microprocessor 11 by the operator from the keyboard 10.

Printer 15 may be any suitable printer known in the art. In most text processing systems, the printer 15 is basically a standard output terminal printer having a type ball element or a daisy-wheel print element.

Diskette storage device 16 may also be any suitable disk storage device which is capable of storing serial by byte data supplied to it at determined sector address locations, each of which are randomly addressable by the microprocessor 11 to retrieve the data. Spatially related data supplied to diskette storage device 16 is stored in the display data area 28 of the memory 23 in encoded form. The other section of memory 23 shown in FIG. 3 is the display format buffer area 29 which is involved in the handling of spatially related data in decoded form.

Figure 4:
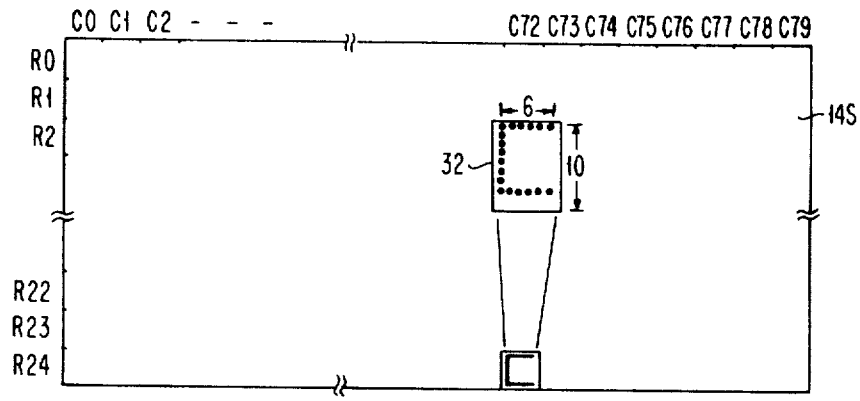
FIG. 4 is a diagrammatic view of the display shown in FIG. 1.

FIG. 4 is a schematic representation of the screen 14A of display device 14. As shown in FIG. 4, the screen 14S has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 32 in FIG. 4. The interaction of the refresh buffer 12 and the display device 14 is to convert the characters stored at a location in the buffer 12 to the corresponding character as formed in a 6×10 dot matrix at the equivalent location on the display device 14. Display device 14 generally is provided with its own set of electronics to achieve that conversion. The microprocessor 11 need only supply the address and load the buffer 12 with the appropriate characters.

The diskette storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the diskette. Data from the device 16 is supplied to the microprocessor 11 serial by byte from the addressed sector and storage tracks when requested.

It will be understood that all of the above described functions and interactions involving the microprocessor 11 are achieved through suitable programs which are also stored in memory 23 and which are called into operation in response to data from the keyboard 10 or interrupt signals generated by the various components of the system shown in FIG. 1.

As described in the related application Ser. No. 264,368 previously identified, the spatially related data is initially entered into an area of memory 23 designated as the display format buffer 29, which is similar in function to the text storage buffer 27 in that it supplies output data to the refresh buffer 12 for display. The format of the data stored in the display format buffer 29 of FIG. 3 is exactly the same as the format of the text data stored in the text storage buffer 27.

The display format buffer 29 is, in practice, a section of memory 23 referred to generally as the Horizontal Display Control Block (HDBC). The HDBC is fixed between address positions in memory 23 and, in practice, may be approximately 6,000 storage positions of the memory 23. The display format buffer 29 is variable in size, and its beginning position is fixed at a point in memory 23 near the beginning of the HDCB. The bottom section of the HDCB contains the display data area 28 for storing the data in vector format. The end of the display data area 28 is fixed, while the starting point varies as the length of the stored vectors. This permits a "free space" between the display format buffer 29 and the display data area 28 which is employed in modifying the data in either area, e.g., lengthening or shortening the data. As explained in detail in the related application Ser. No. 264,368 referred to earlier, the entry of spatial data into the system is similar to the entry of text data except that the operator is presented with the header information on the screen 14S. As a line of spatial data is entered, it is displayed to the operator from the display format buffer 29. However, at some subsequent time, the entered data is encoded in a vector format and stored in the display data area 28. The display format buffer 29, therefore, merely functions to provide to the display device 14 some predetermined "slice" of all of the spatially related data stored in vector format in the display data area 28.

The vector format employed for storing the data in the display data area 28 is discussed in detail in the related application Ser. No. 264,368 previously identified. Each line or row of the matrix comprises a row vector and a plurality of column vectors. The row vector comprises four bytes designated LLTR, respectively, where byte positions 0 and 1, i.e., LL, store the total number of bytes on the line (including the four bytes of the vector description), byte position 2, i.e., T, indicates the type of line and, in this example, will be considered always to be 0. Byte position 3, i.e., R, is the row number, which permits a table of 255 rows. The data in each column is also encoded as a vector having the format 11tc where 11 is two byte positions specifying the length of the data in the number of characters which are in the column, including the four byte representation 11tc. "t" is a 1-byte designation of the type of data in the column which, in the present example, will be either 1 or 0. A "zero" indication signifies that the data portion of the vector is actual data. A "one" indication in the type byte indicates that the data portion of the vector is a 6-byte pointer, 4 bytes of which designate a location in memory 23 where the data is stored, and the last two bytes indicate the length of that stored data. The last byte of the column vector, c, is the column number, thereby permitting a table having 255 columns.

At the point in the preparation of the document where a table of spatially related data is to be entered into the system, the operator notifies the system by placing the system in a query-response mode, where one option presented to the operator is to "Create a File." After selecting this option and assigning a name to the file, the system prompts the operator for defined parameters of the file by column or field, such as the name of the column or field, the type of data to be placed in the column, and the width of each column. The information entered by the operator is stored in memory as a table similar to that shown below.

TABLE 1

| FILE NAME: | PATENT | |
|---|---|---|
| DISKETTE: | 001 | |
| Field # | Field Name | Max. Width |
| 0 | Rec. ID | 9 |
| 1 | Patent Number | 16 |
| 2 | Issue Data | 10 |
| 3 | Serial No. | 10 |
| 4 | Filing Date | 13 |
| 5 | Assignee | 25 |
| 6 | 1st Inventor | 21 |
| 7 | 2nd Inventor | 21 |
| 8 | 3rd Inventor | 21 |
| 9 | 4th Inventor | 21 |
| 10 | 5th Inventor | 21 |
| 11 | Priority Country | 16 |
| 12 | P.O. Class OR | 12 |
| 13 | P.O. Class XR1 | 13 |
| 14 | P.O. Class XR2 | 13 |
| 15 | P.O. Class XR3 | 13 |
| 16 | P.O. Class XR4 | 13 |
| 17 | P.O. Class XR5 | 13 |

After all the parameters have been defined, the header data is displayed to the operator to assist in the entry of the records into the file.

The details of how the spatial data is entered into the system are set forth in the related application Ser. No. 264,368 previously identified, including how the data is transferred to memory 23 in vector format and to the diskette in compressed vector format.

The invention will be described as if the data to be printed, along with the necessary print control codes is first transferred to a line buffer which is then transferred to the printer 15. The invention is applicable to systems where the print buffer 15B is less than a line or greater than a line, such as a page buffer.

It will be assumed for purposes of explanation that the system shown in FIG. 1 has been requested to print the patent file as it is stored. It should also be assumed that the printer 15 shown in FIG. 1 has the capability of printing only 80 character positions on a line, such that when the file of spatially related data represented by Table 1 must be printed out, the header data and each of the records will be printed as shown in FIG. 5.

The printout, as shown in FIG. 5, comprises five lines of header data corresponding to the titles or field names and field widths of the various fields in Table 1. The underscoring of the field names, as shown in FIG. 5, represents the maximum width of the corresponding field.

FIG. 5 also illustrates two records R1 and R2 which have been printed out. Each record R1 and R2 also consists of five lines of data where each line corresponds respectively to the field headings of the five lines of the header data.

While the field titles, as shown in FIG. 5, are underscored for the maximum number of character spaces previously assigned to the field, as indicated in Table 1, this is not necessary. It will be seen that the data in line 1 of record R1 corresponds to the field names of line 1 of the header data and that the data in line 1 of the record R1 is aligned with the corrsponding field in the header data. The data in line 2 of the record R1 is similarly positioned with the appropriate field names in line 2 of the header data. Lines 3-5 of the record R1 are similarly arranged relative to lines 3-5 of the header information.

The format of each line is established by the microprocessor 11 based on a print program stored in the memory 23 of the microprocessor 1 which employs the data and width parameters stored in the table 1 for printing the five lines of header data and employs the information generated by printing the header data for printing the five lines of each stored record R1, R2, . . . Rn shown.

In building the first line of header data, the print program addresses the able 1 stored in memory 23 which contains the field names and maximum permissible field widths. The address in memory 23 where the table 1 is stored is obtained by the program in response to the operator entering the name of the file to be outputed to the printer 15. The first field is always the record I.D. field. The seven characters "Rec. ID" are transferred to the print buffer 15B. The special no erase backspace control characters are next entered into the buffer 15B. The number of these control characters corresponds to the number of characters in the field name, so that the carriage is returned to the start of the field name. A number of underline characters are next transferred to the buffer 15B, the number being determined by the maximum width figure stored in the table 1 or the width of the field name, which ever is greater.

If the printer 15 has been provided with the automatic underscore feature which is now standard in many output printers, the backspace and underline method described above could be replaced with a method using the automatic underscore feature.

The program next provides a three-character space at the end of the first field. The program then proceeds to check the current position of the print carriage, the number of character positions required for the next field, and the number of character positions remaining on the first line. If the next field will fit on the line, the field name if transferred to the buffer 15B of printer 15, as described for the first field name. The number of character positions occupied by the underscore again corresponds to the maximum field width or the field name width, whichever is greater.

The above process is repeated until the remaining sapce on line 1 is not sufficient to accommodate the next field. The program then enters a carriage return into the print buffer 15B following the end of the last field on line 1 and begins line 2 at print position 0. The process continues printing the field names in succession from Table 1 until all of the field names have been printed.

Alternatively, rather than printing one line of field names at a time, the buffer 15B may, in effect, store each line of the material to be printed as it is transferred from the table 1 in memory 23 to the print buffer 15B.

During the process of transferring the field names to the print buffer 15B, the microprocessor 11 is completing the following table 2, indicating the line and print position of the start of each field of the header.

TABLE 2

|  | Column | Print Position Start | Print Position Finish | Width |
|---|---|---|---|---|
| Line 1 | 0 | 0 | 8 | 9 |
|  | s | 9 | 11 | 3 |
|  | 1 | 12 | 27 | 16 |
|  | s | 28 | 30 | 3 |
|  | 2 | 31 | 40 | 10 |
|  | s | 41 | 43 | 3 |
|  | 3 | 44 | 53 | 10 |
|  | s | 54 | 56 | 3 |
|  | 4 | 57 | 69 | 13 |
| Line 2 | 5 | 0 | 24 | 25 |
|  | s | 25 | 27 | 3 |
|  | 6 | 28 | 48 | 21 |
|  | s | 49 | 51 | 3 |
|  | 7 | 52 | 72 | 21 |
| Line 3 | 8 | 0 | 20 | 21 |
|  | s | 21 | 23 | 3 |
|  | 9 | 24 | 44 | 21 |
|  | s | 45 | 47 | 3 |
|  | 10 | 48 | 68 | 21 |
| Line 4 | 11 | 0 | 15 | 16 |
|  | s | 16 | 18 | 3 |
|  | 12 | 19 | 30 | 12 |
|  | s | 31 | 33 | 3 |
|  | 13 | 34 | 46 | 13 |
|  | s | 47 | 49 | 3 |
|  | 14 | 50 | 62 | 13 |
|  | s | 63 | 65 | 3 |
|  | 15 | 66 | 78 | 13 |
| Line 5 | 16 | 0 | 12 | 13 |
|  | s | 13 | 15 | 3 |
|  | 17 | 16 | 28 | 13 |

The printing of each record R in the file, namely the formatting of the record R as it is printed, is effectively determined by the data generated in Table 2, shown above, during the printing of the header data.

Prior to transferring the first record R1 from the system to the print buffer 15B, the processor 11 transfers a "set tabs" command to the print buffer 15B which identifies the print positions for line 1 where the fields start in line 1 of the header. The data stored in the column 0 vector is then transferred to the print buffer 15B followed by a tab control character. The data from the column 1 vector is next transferred to the print buffer 15B followed by a tab control character. The process is repeated for each column in line 1 of the data, except that at the end of column 4 data transfer, a carriage return control character is inserted rather than a tab character.

It has been assumed in accordance with the present description, that the printer 15 has a mechanism 15TM which will automatically establish tab stops 15S, shown schematically in FIG. 1, for the line to be printed and, therefore responds to the "set tabs" command to be supplied to the printer 15 at the beginning of each line. If the printer 15 is not equipped to respond to a "set tabs" command, the equivalent function may be obtained by the processor 11 establishing the tab positions in any of the various ways presently known in the art.

Data in columns 5, 6 and 7 is transferred to the print buffer 15B as line 2 in the same manner as line 1. That is, the "set tabs"command is the first character and specifies the print positions for line 2 where tabs should be set by tab mechanism 15TM to properly position the data for fields 5, 6 and 7 of record 1. The process continues with the "set tabs" character being the first character in the line and specifying for that line the tabs to be set so that the data is properly positioned under the appropriate field titles in the header.

If desired, two carriage return characters may be transferred to the print buffer 15B after the last field of data of a record to provide a 2-line spacing between records.

The process just described is repeated for each record. If desired, the system may control placement of records on pages, as is well known in the art It will be recognized that the above-described process provides a relatively simple approach for printing a file of spatially related data on the printer 15 of a text processing system in that only one parameter, namely, line print capacity, need be supplied by the operator in order to format the output printing of the file. It should also be noted that the format is relatively insensitive to the specifies of the record format and the length of the record.

While the invention has been particulary shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. A method of printing with a printer a file of spatially related data which is stored in a text processing system and defined by a table of header data including field names and maximum field width information and wherein the records of said file are stored in a vector format including row and column designations, said method comprising the steps of:
   (a) establishing for said printer the number of print positions in each line;
   (b) transferring from said table of field names each field name in succession together with a number of blank padding characters determined by the maximum widths of the fields as indicated in said table;
   (c) starting another print line whenever the next field name and padding characters exceed the number of print positions remaining in said line until all the header data has been transferred;
   (d) storing print position data identifying where each transferred field begins; and
   (e) transferring to said printer a control character prior to the transfer of each said vector formatted record to cause the data associated with each of said column designations to be aligned with the start of its corresponding field name.

2. The method recited in claim 1 in which the number of print positions in a line as established in step (a) is automatic in response to the operator requesting the system to print said file.

3. The method recited in claim 1 in which the maximum assigned width for said fields require more than one print line.

4. The method recited in claim 3 in which an underscore is associated with each field name in said header data.

5. The method recited in claim 4 in which said underscore begins at the same print position as the associated field name and extends for the number of print positions corresponding to the maximum width of said field or the width of the field name, whichever is greater.

6. The method recited in claim 5 in which adjacent fields in one line are spaced apart a predetermined number of character positions.

* * * * *